Sept. 26, 1933.   L. B. AULT   1,928,444
PICK-UP ARM
Filed Aug. 6, 1929
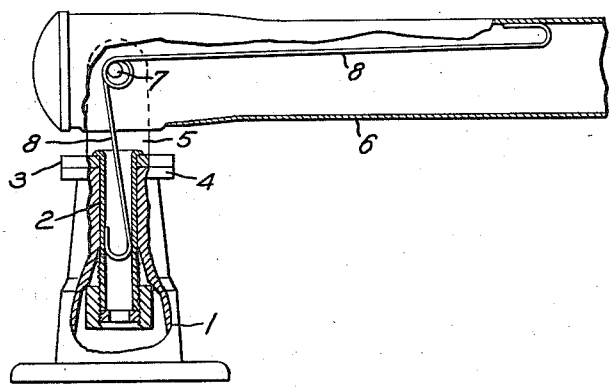
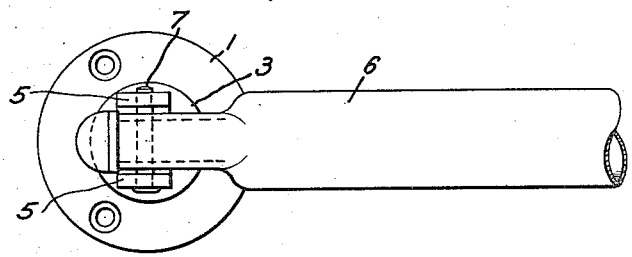
Inventor:
Leonard B. Ault,
by Charles E. Tullar
His Attorney.

Patented Sept. 26, 1933

1,928,444

UNITED STATES PATENT OFFICE 1,928,444

PICK-UP ARM

Leonard B. Ault, Coventry, England, assignor to General Electric Company, a corporation of New York Application August 6, 1929, Serial No. 383,855, and in Great Britain August 16, 1928

6 Claims. (Cl. 274—1)

My invention relates to sound reproducing instruments and more particularly to instruments such as phonographs, in which the sound record on a disc is transmitted through a needle on a tone arm or pick-up arm, either to an amplifying horn or to an electrical amplifying device. In such instruments where the sound is amplified by means of a horn, the sound box is usually pivoted in such a way that the whole of its weight is acting on a needle point, thus keeping it in close contact with the record, but where an electrical amplifying device is employed, the pick-up which carries the needle is considerably heavier than the sound box, and means have to be provided to counter-balance the weight of this, otherwise the needle will press too heavily on the record and cut into it. Hitherto it has been proposed to provide a counter-weight on the opposite side of its pivot from the needle to counter-balance this weight, but this is not altogether satisfactory and is unsightly.

The object of the present invention is to provide an improved balancing arrangement for the weight of the pick-up device. The pick-up arm of these instruments is usually capable of swinging in a horizontal plane parallel to the plane of the disc, so that the needle will follow the grooves in the disc, and also at right angles to the plane of the disc, so that the needle may be easily removed, and the pick-up arm held out of the way, so that a fresh disc can be put on the machine.

In the accompanying drawing which illustrates this invention Fig. 1 is a part sectional elevation of a balanced pick-up arm and Fig. 2 a plan view of the same.

In the drawing 1 represents a pedestal bracket which is secured to the phonograph in proximity to the turntable. The pedestal is provided with a central aperture into which projects a sleeve 2 rigidly secured at its upper edge to a flange 3 which co-operates with a flange 4 formed on the pedestal. Secured to the flange 3 are two brackets 5 between which the end of the pick-up arm 6 is pivoted on a pin 7. The sleeve 2 rotates easily in the pedestal to enable the pick-up arm to travel across the record. In order to balance the weight of the pick-up and pick-up arm a spring 8 is provided which surrounds the pivot pin 7, one end extending along the interior of the pick-up arm and the other projecting into the sleeve 2.

The spring 8 is so formed initially that when placed in position as above-described it is barely sufficient to counter-balance the weight of the pick-up arm and the pick-up. By this arrangement the needle is kept in contact with the disc but the pressure is reduced to the minimum desirable.

What I claim as new and desire to secure by Letters Patent of the United States is:

1. A pick-up arm provided with a pivotal support, and a spring surrounding and supported by said support within said arm and arranged to counterbalance the weight of said pick-up arm.

2. A pick-up arm provided with a pivotal support carried by a sleeve adapted to rotate in a fixed pedestal, and a spring surrounding and supported by said support and extending into said sleeve for counter-balancing the weight of said pick-up arm.

3. In combination, a pick-up arm, a pedestal, a sleeve arranged to rotate in said pedestal, a pivotal support between said pick-up arm and sleeve and carried by said sleeve, and a spring positioned within said arm by said support and extending into said sleeve for counterbalancing the weight of said pick-up arm.

4. A hollow pick-up arm provided with a pivotal support, means including a tubular member to carry said main support, and a spring surrounding and supported by said support, said spring having a portion extending into said tubular member, said spring having a second portion extending within said arm and arranged to counter-balance the weight of said pick-up arm.

5. A hollow pick-up arm provided with a pivotal support carried by a sleeve adapted to rotate in a fixed pedestal, and an L-shaped spring surrounding and supported by said support, one end of said spring extending into said hollow arm and the other end of said spring extending into said sleeve, for counter-balancing the weight of said pick-up arm.

6. In combination, a hollow pick-up arm, a pedestal, a sleeve arranged to rotate in said pedestal, a pivotal support between said pick-up arm and sleeve, and a spring connected to and supported by said support and having two portions arranged at an angle to each other, one of said portions extending into said sleeve from said support, the other of said portions being mounted within said tubular arm, said spring being arranged to operate against said sleeve and pick-up arm to counter-balance the weight of the pick-up arm.

LEONARD B. AULT.